2,821,936

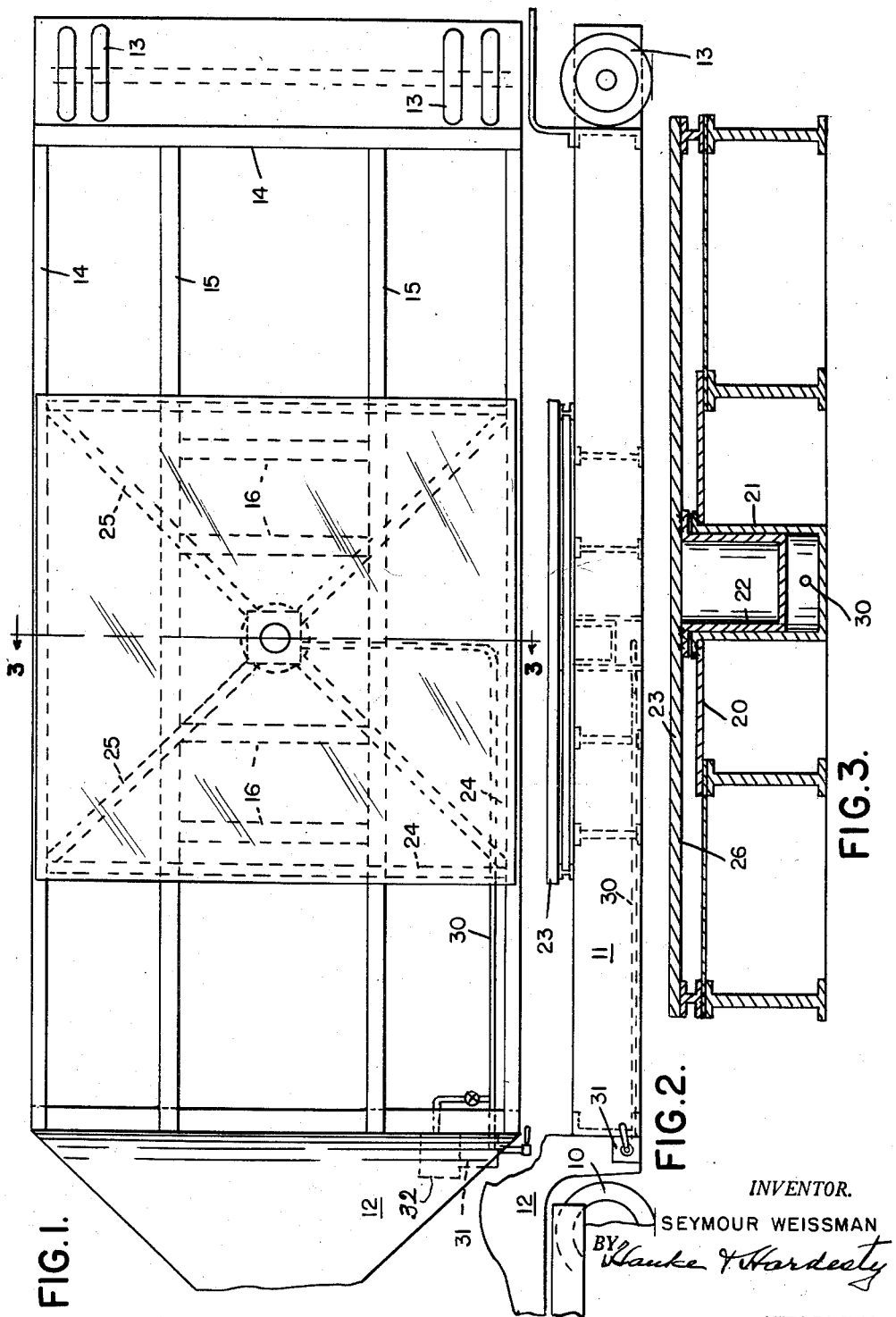

TRANSPORT MEANS FOR HEAVY SELF PROPELLED MACHINES

Seymour Weissman, Detroit, Mich.

Application August 1, 1955, Serial No. 525,515

1 Claim. (Cl. 104—45)

The present invention relates to transport means for heavy self-propelled earth moving machines such as bulldozers, graders, power shovels and the like. The modern heavy earth moving machines are usually mounted upon their own chassis and usually provided with so-called caterpillar treads. Such machines are sufficiently mobile to enable them to do the work for which they are designed but are slow and provided with treads not permitted to be used upon highways.

Consequently, when being moved to a new location they must be transported upon vehicles allowed upon the highways and of greater speed. Such vehicles are usually tractor drawn trailers. Further, since such machines, while of permissible width, are much too long to be loaded and carried on their vehicles crosswise and hence they must be placed lengthwise.

Lengthwise loading of, for example, a power shovel is usually accomplished by detaching the trailer from the tractor and loading by moving the shovel onto the trailer from the end and then reconnecting the tractor.

Among the objects of the present invention is to provide means whereby to permit loading of such heavy machines upon such vehicles from the side and without the necessity of detaching the tractor.

Another object is to provide means by which such heavy self-propelled machines may be driven onto the vehicle from the side thereof and subsequently partially rotated to place the machine lengthwise of the vehicle.

Still other objects and advantages will readily occur to those skilled in the art upon reference to the following description and the accompanying drawings in which Figure 1 is a plan view of a tractor drawn trailer embodying the present invention.

Figure 2 is a side elevation of the same.

Figure 3 is a section on line 3—3 of Figure 1.

In the drawing there is shown a trailer intended to be drawn by a suitable tractor not shown in full but indicated by a portion of a wheel at 10. The trailer shown is conventional in construction but with the addition of the means embodying the present invention. The trailer insofar as it is conventional comprises a bed portion 11 having at its forward end a so-called "goose neck" 12 consisting of a member extending upwardly and curved forwardly to extend over the rearward portion of a tractor and connected thereto.

At the rear end, the bed is shown as elevated and extending over suitable wheels and axles 13. The bed 11 is usually constructed of a peripheral frame of heavy channel members or I-beams 14 with additional intermediate I-beams 15, and with an upper surfacing of steel plates.

In the present invention, additional supporting structure is added and this is indicated as a plurality of short I-beams 16 extending between the members 15 and located a short distance in front of and to the rear of the central point of the bed.

At the central point of the bed 11 an additional heavier plate 20 is supported upon the members 15 and 16 and in a suitable opening in plate 20 is mounted a cylinder 21, open at its upper end and cooperating with a suitable piston 22. Mounted upon the upper end of piston 22 is a platform 23 consisting of a frame composed of peripheral I-beams 24 and suitable diagonals 25 and a surface plate 26. The platform 23 is preferably square and equal in width with the bed 11 and normally rests thereon. Connected into cylinder 21 is a suitable conduit 30 leading to one end of the bed 11 and to a suitable pump 31, which may be actuated by means of a suitable motor or by hand, and also through a branch conduit to a reserve tank 32. A hand operated valve 33 being in the branch conduit to allow the fluid to flow from cylinder 21 to the tank 32 to lower the platform 23. The pump inlet of course is also connected to the tank 32.

In the operation of the invention, the platform 23 is arranged square with the bed 11 and using suitable ramps (not shown) the machine (shovel, bulldozer or the like) is driven up on the bed and platform from the side and without detaching the tractor when the machine is on the platform 23, the pump 31 is operated to lift the piston 22 and platform 23 a short distance and the platform and machine rotated 90° to align the machine with the bed 11 and the pressure in cylinder relieved to permit the platform to settle and rest upon the bed 11. Since the platform 23 when elevated, floats on the fluid in cylinder 21, its rotation is easily accomplished by hand. No motor or other power application is necessary.

While the invention has been described in connection with a highway trailer, it is of course obvious that it may be used with advantage with any flat bed transport and this is also contemplated.

I claim:

In combination with the flat bed of a vehicle for transport of heavy self-propelled machines, a rectangular platform mounted centrally of said bed, means located centrally of said bed and constituting means for elevating the platform above the bed and lowering it to rest thereon, said means permitting the partial rotation of said platform while elevated, and means preventing rotation of said platform during transport.

References Cited in the file of this patent

UNITED STATES PATENTS

| | | |
|---|---|---|
| 1,910,398 | Ludington | May 23, 1933 |
| 2,050,000 | Frost | Aug. 4, 1936 |
| 2,058,891 | Kellett | Oct. 27, 1936 |
| 2,653,827 | Manning | Sept. 29, 1953 |

FOREIGN PATENTS

| | | |
|---|---|---|
| 661,995 | Germany | July 1, 1938 |